Patented Dec. 8, 1925.

1,564,970

UNITED STATES PATENT OFFICE.

WILLIAM R. LONG, OF ST. LOUIS, MISSOURI.

ADHESIVE.

No Drawing. Original application filed September 24, 1924, Serial No. 739,707. Divided and this application filed February 28, 1925. Serial No. 12,451.

*To all whom it may concern:*

Be it known that WILLIAM R. LONG, a citizen of the United States of America, residing at St. Louis, State of Missouri, has invented certain new and useful Improvements in Adhesives, of which the following is a specification.

This is a divisional application divided out of applicant's application for glue, filed September 24, 1924, Serial No. 739,707. The object of my invention is to produce an adhesive that is practically odorless, and a method of manufacturing it which will be inexpensive and which can be prepared quickly without the ordinary method of cooking and which will remain in a thin liquid state ready for use for a reasonable time and will not jell.

This product is produced principally for gluing paper such as is used in the preparation of fibre and corrugated shipping cases, and also for sealing the cases or cartons after they have been packed with merchandise. The product may also be used for gluing other substances. My method of manufacturing consists in converting cornstarch into suitable gum to be hereinafter described, by means of an acid and the application of heat. My method of converting the cornstarch into gum is as follows. To 100 pounds of cornstarch I add 5½ pints of a hydrochloric solution composed of 13½% commercial hydrochloric acid and 86½% of water. This product is placed on a floor or in a bin or other suitable container where it is permitted to remain for a period varying from twenty-four to forty-eight hours. This is done to permit the acid solution to thoroughly permeate the starch which puts the startch in a more suitable condition for conversion. The product is then placed in a converter of suitable size in such quantities as desired. This converter preferably comprises an air tight receptacle and a means of applying heat either directly, or indirectly through a jacket. The mixing apparatus is operatively secured in the converter and the latter is supplied with a steam gage. The steam gage is necessary because when heat is applied pressure develops from the moisture contained in the starch. The mixture is agitated by means of the mixing apparatus while subject to heat. If a pressure of fifty pounds is reached or desired, less of the acid solution should be used, but where a lower pressure is desired, that is from two to five pounds, the mixture may be used as indicated. Before the converter is opened the pressure should be reduced to atmosphere by permitting the escape of the steam through a small steam valve attached to the converter, and the application of heat discontinued. The gum produced by this method will be found to be more economical than any other method I have tried and it is more flexible and if emulsified with an amount of borax varying from ten to fifteen percent, and cooked in the proper proportion with water produces a valuable glue for many purposes. A slightly inferior grade of glue may be produced without having a pressure above atmosphere in the converter simply by permitting the steam in the converter to remain so that the product is converted in a bath of steam. This is accomplished by allowing the valve to be opened sufficiently for the escape of sufficient steam to prevent a pressure above atmosphere. The use of a low pressure, however, is more desirable. The time required to convert cornstarch as above explained varies according to the heat applied and the amount of acid used, and will range from forty-five minutes to one and one-half hours.

In order to test the product to see if it is finished, about one or two ounces are taken from the converter and about 12% of borax added in order to emulsify it. A solution is then made of this with five parts of water and quickly cooked over a gas flame; if the product is finished, a thin syrupy substance will result. This method of testing has proven more reliable than chemical or gravity tests.

To this converted cornstarch a sufficient amount of soda ash is added to neutralize the acid and the product removed from the converter and spread on a granitoid floor to a thickness of from three to four inches and permitted to cool. The resulting product is what I call gum. When this gum is thoroughly cooled it is placed in a mixing machine and 8% of caustic soda by weight is added and 4% of ganulated or powdered borax. This is mixed for a few minutes until the chemicals are thoroughly incorporated in the gum. When this point is reached, it will be found that the mixture is reheated to a certain extent. The mixture is then placed on the floor again and permitted to cool. It is then barreled and ready for use.

If the product is barreled while it is warm it will discolor and small yellow lumps will form, making it undesirable for use because such lumps are not readily soluble. When this compound is mixed at the rate of two pounds to three quarts of warm or hot water, it produces a thin glue like solution which flows freely and is easily applied, and can be spread thinly with a hand brush on the flats of fibre shipping cases, and which will seal such shipping cases in less than sixty seconds. This is believed to be the most economical glue agent yet produced for the work for which it is recommended. The conventional gluing agent used for fibre board at the present time is sodium silicate. This weighs approximately twelve pounds to the gallon, while my product weighs less than nine pounds and will cover 30% more surface to the gallon than sodium silicate.

What I claim and wish to secure by Letters Patent is,

1. A method of treating cornstarch which consists in adding hydrochloric acid and water to cornstarch and permitting it to remain thus for a period ranging between twenty-four and forty-eight hours, then placing it in a converter in which it is agitated, subjected to heat and to steam pressure.

2. A method of making gum which consists in adding 5½ pints of a solution of hydrochloric acid containing 86½% water and 13½% commercial hydrochloric acid and 100 pounds of cornstarch, and permitting it to stand for a period of time ranging between twenty-four and forty-eight hours, then placing it in a converter where it is agitated, and subjected to heat and steam pressure, and neutralizing the acid with soda ash, and cooling the same in any suitable manner.

In testimony whereof I affix my signature.

WILLIAM R. LONG.